United States Patent [19]
Ruigrok et al.

[11] Patent Number: 5,270,895
[45] Date of Patent: Dec. 14, 1993

[54] COMBINED READ/WRITE THIN-FILM MAGNETIC HEAD WITH COMPOSITE SHARED FLUX GUIDE

[75] Inventors: Jacobus J. M. Ruigrok; Franciscus A. Pronk, both of Eindhoven, Netherlands

[73] Assignee: U.S. Philips Corporation, New York, N.Y.

[21] Appl. No.: 761,585

[22] Filed: Sep. 18, 1991

[30] Foreign Application Priority Data

Jul. 5, 1991 [EP] European Pat. Off. ........ 91201739.9

[51] Int. Cl.$^5$ .............................................. G11B 5/265
[52] U.S. Cl. ...................... 360/126; 29/603; 360/113; 360/122
[58] Field of Search ............... 360/122, 119, 126, 113; 29/603

[56] References Cited

U.S. PATENT DOCUMENTS

| | | | |
|---|---|---|---|
| 4,052,748 | 10/1977 | Kuijk | 360/113 |
| 5,097,371 | 3/1992 | Somers | 360/113 |

FOREIGN PATENT DOCUMENTS

| | | | |
|---|---|---|---|
| 62-46414 | 2/1987 | Japan | 360/119 |
| 62-145527 | 6/1987 | Japan | 360/113 |

Primary Examiner—Constantine Hannaher
Attorney, Agent, or Firm—Norman N. Spain

[57] ABSTRACT

Combined read/write thin-film magnetic head comprising a read portion including a magneto-resistive element, a write portion including an inductive element, and a shared flux guide between the read and write portions. Improved separation of the read and write functions is achieved by providing the shared flux guide as a sandwich structure of two soft magnetic layers separated by an insulating layer, except that the soft-magnetic layers are interconnected in a magnetically conducting manner proximate to the head face.

22 Claims, 1 Drawing Sheet

COMBINED READ/WRITE THIN-FILM MAGNETIC HEAD WITH COMPOSITE SHARED FLUX GUIDE

BACKGROUND OF THE INVENTION

The invention relates to a thin-film magnetic head comprising a substrate, a first transducing element and a second transducing element, which elements are located at different distances from the substrate, and three substantially parallel extending magnetically conducting flux guides for magnetic cooperation with said elements, a non-magnetic read gap adjacent to a head face extending between the first flux guide and a second flux guide and a non-magneti write gap adjacent to the head face extending between the second (shared) flux guide and the third flux guide, said gaps, viewed from the substrate, being situated one above the other.

A magnetic head of this type is known from JP-A 62-145527 (herein incorporated by reference). The known magnetic head is a combined write/read head having a contact or head face, which is manufactured in accordance with a thin-film technique and comprises three flux guides, viz. two outer flux guides and one central (shared) flux guide. A transducing or inductive element in the form of an electric conductor and a non-magnetic layer are provided between one of the outer flux guides and the central flux guide, the non-magnetic layer defining a write gap. The known magnetic head thereby forms a write portion, for writing information on a magnetic medium for example, a magnetic tape moving along the contact face when the electric conductor is controlled. A transducing or magnetoresistive element, a bias winding and a non-magnetic layer defining a read gap are provided between the central (shared) flux guide and the other, outer flux guide. The portion of the known magnetic head formed thereby is a read portion for reading information on the medium moving along the contact face.

In the known magnetic head, the central flux guide is a shared flux guide which forms part of a magnetic yoke of the write portion as well as of the magnetic yoke of the read portion of the magnetic head. It is known that a write gap may function as a read gap when information is being read. This phenomenon is utilized in a structure in which information is written and read by one and the same inductive element. However, in the write/read magnetic head known from said Japanese Patent publication, the write gap functioning as a read gap has the detrimental result that a part of the magnetic flux of the passing medium which is opposite the write gap is guided towards the magnetoresistive element via the shared central flux guide. As a result, extra magnetic pulses are introduced into the magnetoresistive element in the case of, for example, a medium comprising digital information, which pulses interfere with the magnetic pulses guided towards the magnetoresistive element via the read gap, which perturbs the signal to be measured and detrimentally influences the signal-to-noise ratio.

The detrimental phenomenon described above, which occurs in the known magnetic head during operation, is elucidated as follows. If it is assumed that a small magnetized area on a recording medium, for example, a magnetic tape is present just in front of the write gap, this area can be considered to be an almost ideal flux source due to the low permeability of the medium. A part of the flux, which is dependent on the distance from the size of the write gap, will enter the write portion via the outer flux guide adjacent to the write gap and will leave the write portion via the central flux guide, or vice versa. The greater part of the magnetic flux entering the write portion returns to the contact face via the magnetic yoke of the write portion. However, since the outer flux guide adjacent to the read gap extends parallel to and at a short distance from the shared central flux guide, a certain part of the flux taken up in the write portion will cross over to the last-mentioned outer flux guide. This part of the flux subsequently traverses the sensitive magnetoresistive element and then returns mainly via the central flux guide to the magnetized area on the medium. The flux portion which directly crosses over to said magnetic area from the outer flux guide adjacent to the read gap is negligibly small due to the relatively large distance between this flux guide and the magnetic area and due to the exponential character of the distance losses then occurring. Dependent on the direction of movement of the medium, the part of the flux traversing the magnetoresistive element gives rise to an extra pulse before or after the main pulse which results from reading said magnetized area by the magnetic head.

Measurements and calculations which have been carried out on magnetic head structures related to the known magnetic head show extra pulses with an amplitude ranging between 5 and 15% of the amplitude of the main pulse, dependent on the thickness of the central flux guide and on the permeability of the soft-magnetic material of the flux guides.

Moreover, when information is being written, the quantity of magnetic flux generated by the inductive element and guided towards the magnetoresistive element via the shared flux guide may be so much that the magnetoresistive element is destabilized, which may considerably reduce its sensitivity.

OBJECTS AND SUMMARY OF THE INVENTION

It is an object of the invention to provide a magnetic head of the type described in the opening paragraph in which a better magnetic separation between the write portion and the read portion of the magnetic head is achieved.

To this end, the magnetic head according to the invention is characterized in that the second (shared) flux guide extending between the first flux guide and the third flux guide comprises two soft-magnetic layers and an insulation layer of a non-magnetic material extending substantially parallel to the substrate and being situated between the soft-magnetic layers, the soft-magnetic layers being interconnected in a magnetically conducting manner proximate to the head face. Due to the sandwich-like structure of the central (shared) flux guide in the magnetic head according to the invention, the first flux guide and one of the soft-magnetic layers, notably the adjoining layer, constitutes a first magnetic circuit, provided with the read gap, for the magnetoresistive element, and the third flux guide and the other soft-magnetic layer of the second flux guide constitute a second magnetic circuit, provided with the write gap, for the inductive element. A distance is created between the two soft-magnetic layers so as to form large magnetic crossover resistances between said magnetic circuits in order to inhibit the crossing of magnetic fluxes. In order to inhibit the insulation layer between the two soft-magnetic layers of the second flux conductor from functioning as a read gap, said soft-magnetic layers are interconnected at the head face.

The magnetic head according to the invention is suitable for analog as well as digital applications. For example, multi-track audio, video and data recording are possible applications.

An embodiment of the magnetic head according to the invention is characterized in that the insulation layer is situated at a distance from the head face, the second flux guide having an end portion situated at the head face and formed exclusively from a soft-magnetic material, the insulation layer being adjacent to said end portion. In this embodiment disturbing magnetic pulses as a result of the central flux guide itself are prevented.

It has been found that in the magnetic head according to the invention the thickness of the insulation layer between the two soft-magnetic layers of the second flux guide plays an important role in the extent to which interfering pulses are passed on. Very good results can be achieved if the insulation layer between the soft-magnetic layers has a thickness which is at least equal to $3 h^2/\mu_r t$, in which h is the length of the shortest soft-magnetic layer of the second flux guide, viewed from the head face, $\mu_r = \sqrt{\mu_{ra} \cdot \mu_{rb}}$, in which $\mu_{ra}$ and $\mu_{rb}$ are the relative permeabilities of the materials of said first and second said soft-magnetic layers, respectively, and in which $t = \sqrt{t_a \cdot t_b}$, in which $t_a$ and $t_b$ are the thicknesses of the first and the second layer, respectively.

In a practical embodiment the insulation layer has a thickness of at least 1 μm and the soft-magnetic layers have at least substantially the same thickness, for example, 3 μm.

The invention is particularly suitable for thin-film magnetic heads in which the first transducing element is a magnetoresistive element and the second transducing element is an inductive element and in which the first flux guide is an interrupted layer having two spatially separated flux guide parts bridged by the magnetoresistive element. In such a magnetic head a further decrease of interfering pulses passed on to the magnetoresistive element can be achieved by providing the magnetoresistive element at a side, remote from the inductive element, of the first flux guide. An additional advantage is an efficiency improvement of the read portion of the magnetic head.

A technologically attractive embodiment is characterized in that the first flux guide is the flux guide situated most proximate to the non-magnetic substrate, the magnetoresistive element extending between said flux guide and the substrate.

An embodiment is characterized in that at least one of the transducing elements extends as far as the head face. As a result the length of the shortest soft-magnetic layer of the second flux guide may be relatively small. An advantage thereof is a small extra pulse. Technological advantages are the planar structure and the insensitivity to gap height variations.

BRIEF DESCRIPTION OF THE DRAWING

The invention will be described in greater detail by way of example with reference to the accompanying drawing in which.

DESCRIPTION OF THE PREFERRED EMBODIMENTS

Figure 1:
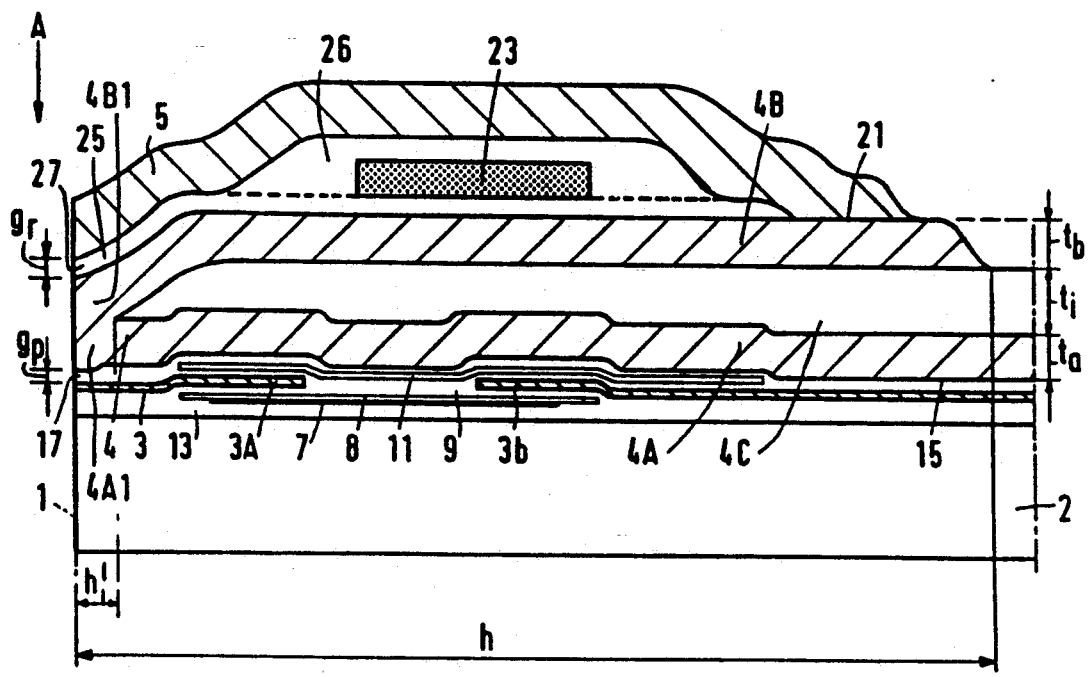
FIG. 1 is a cross-section of a first embodiment of the magnetic head according to the invention and FIG. 2 is a diagrammatic cross-section of a second embodiment.

The thin-film magnetic head according to the invention shown in FIG. 1 has a head face or contact face 1 for cooperation with a magnetic recording medium such as a magnetic tape which is movable with respect to the magnetic head in the direction of the arrow A shown. The magnetic head comprises a non-magnetic substrate 2 of, for example a ceramic material such as $Al_2O_3/TiC$ on which a first flux guide 3, a second flux guide 4 and a third flux guide 5 are formed successively. The flux guides are formed from a soft-magnetic material such as NiFe, AlFeSi or an amorphous alloy. For forming a read portion, an electrically conducting magnetoresistive element 7 having barber pole strips or stripes 8 is situated between the substrate 2 and the first flux guide 3. Such an element is described, for example, in U.S. Pat. No. 4,052,748, herein incorporated by reference to form. Opposite the magnetoresistive element 7 the flux guide 3 is interrupted to form a non-magnetic space or gap 9 which is bounded by two flux guide parts 3a and 3b partly overlapping the element 7.

Generally, a bias winding 11 for generating a magnetic field for premagnetizing the magnetoresistive element 7 is provided between the first flux guide 3 and the second flux guide 4. Insulating layers of a magnetic and electrically insulating material such as an oxide, for example, $SiO_2$ or $Al_2O_3$, a synthetic resin or a photoresist are provided on the substrate 2 and between the conducting layers which are present for forming the magnetoresistive element 7, the flux guide 3, the bias winding 11 and the flux guide 4. The joint layers are denoted by the single reference numeral 13.

The first and the second flux guides 3 and 4 define a read gap 17 at the head face 1, in which gap a non-magnetic material such as an oxide is present, likewise as in the space 9. The gap length is denoted by $g_p$. The flux guides 3 and 4, which may be magnetically interconnected in an area 15 via a through-hole (not shown) in the intermediate insulating layer 4C constitute a magnetic circuit for the magnetoresistive element 7.

A write portion comprising the above-mentioned second and third flux guides 4 and 5 and an inductive element 23, particularly a coil or winding, is present on top of the read portion. The inductive element 23 is situated between the last-mentioned flux guides 4 and 5 which bound a non-magnetic write gap 27 having a gap length $g_R$ at the head face 1. Flux guides 4 and 5 are in contact with each other in an area 21. In the write gap 27 as well as around the inductive element there are insulating layers 25, 26 of, for example, oxides or a photoresist.

The second flux guide 4, forming part of both the read portion and the write portion of the magnetic head, is built up layer by layer. The flux guide 4 comprises two soft-magnetic layers 4A and 4B extending substantially parallel to the substrate, between which layers extends an insulation layer 4C of a non-magnetic material such as an oxide or a resist. The soft-magnetic or magnetically conducting layers 4A and 4B have interconnected end portions 4A1 and 4B1 adjacent to the head face 1. The insulation layer 4C is spaced apart from the head face 1 and adjoins the interconnected end portions 4A1 and 4B1.

Like the rest of the magnetic head, the central shared flux guide 4 may be manufactured by known thin-film techniques, using processes such as sputtering, vapour deposition, etching.

The soft-magnetic layers 4A and 4B have the same or approximately the same thickness $t_a$ and $t_b$. The insulation layer 4C has a substantially constant thickness $t_i$ which is at least equal to $3\ h^2/\mu_r t$, in which h is the length, viewed from the head face 1, for example 50 $\mu$m, of the soft-magnetic layer 4B. The term $\mu_r$ is equal to $\sqrt{\mu_{ra}\cdot\mu_{rb}}$, in which $\mu_{ra}$ is the relative permeability of the material of the layer 4A and $\mu_{rb}$ is the relative permeability of the material of the layer 4B. A practical value for $\mu_r$ is 2000. t is equal to $\sqrt{t_a\cdot t_b}$, in which $t_a$ and $t_b$ are the thicknesses of the layers 4A and 4B, respectively. The length $h^1$ of the end portion 4A1 is preferably one to several microns.

Figure 2:
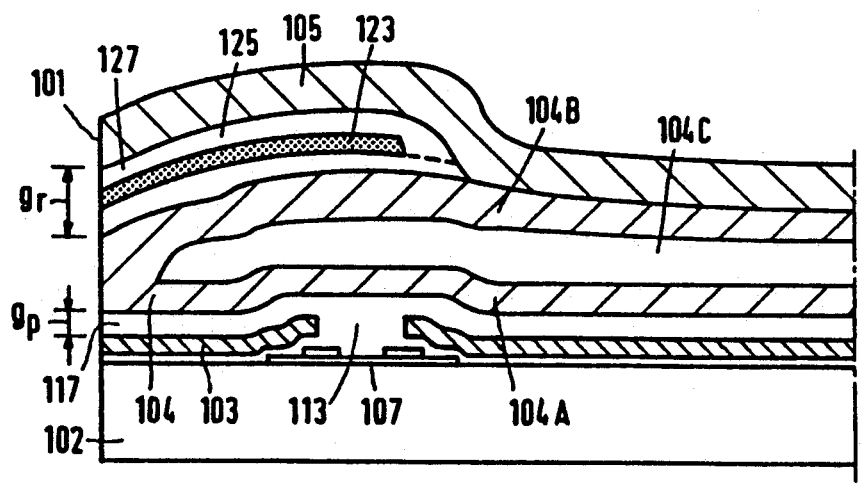

The magnetic head according to the invention shown in FIG. 2 largely corresponds to the embodiment shown in FIG. 1 and will therefore be described briefly. The magnetic head has a read portion provided with a non-magnetic read gap 117 having a gap length $g_p$ and a write portion with a non-magnetic write gap 127 having a gap length $g_R$. The read portion has a structure formed on a substrate 102 which comprises a magnetoresistive element (MR element) 107, a first flux guide 103 and a second flux guide 104. The write portion has a structure which comprises the second flux guide 104, a third flux guide 105 and an inductive element 123 adjacent to the head face 101 and extending between the two flux guides 104 and 105.

The shared flux guide 104 is composed in a sandwich-like manner from two soft-magnetic layers 104A and 104B and an insulation layer 104C extending in between, the layers 104A and 104B extending as far as the head face 101 where they contact each other and define the forward boundary of the insulation layer 104C. Suitable insulating layers 113, 125 of electrically and/or magnetically insulating materials are provided between the electrically and/or magnetically conducting layers.

The invention is not limited to the embodiments shown. The invention is eminently suitable for use in thin-film heads having various juxtaposed combinations with read and write functions. For example, embodiments in which an inductive element instead of an MR element is used in the read portion benifit from the central flux guide built up layer by layer.

We claim:

1. A thin-film magnetic head comprising:
   (a) a substrate,
   (b) a first transducing element and a second transducing element, which elements are located at different distances from the substrate,
   (c) three substantially parallel extending magnetically conducting flux guides for magnetic cooperation with said elements,
   (d) a non-magnetic read gap adjacent to a head face extending between the first flux guide and the second flux guide, and
   (e) a non-magnetic write gap adjacent to the head face extending between the second flux guide and the third flux guide, said gaps, viewed from the substrate, being situated one above the other, characterized in that the second flux guide extending between the first flux guide and the third flux guide comprises two soft-magnetic layers and an insulation layer of a non-magnetic material extending substantially parallel to the substrate and being situated between the soft-magnetic layers, the soft-magnetic layers being interconnected in a magnetically conducting manner proximate to the head face.

2. A magnetic head as claimed in claim 1, characterized in that the insulation layer is situated at a distance from the head face, the second flux guide having an end portion situated at the head face and formed exclusively from a soft-magnetic material, the insulation layer being adjacent to said end portion.

3. A magnetic head as claimed in claim 2, characterized in that the soft-magnetic layers have at least substantially the same thicknesses.

4. A magnetic head as claimed in claim 2, characterized in that at least one of the transducing elements extends as far as the head face.

5. A magnetic head as claimed in claim 1, characterized in that the soft-magnetic layers have at least substantially the same thickness.

6. A magnetic head as claimed in claim 5, characterized in that at least one of the transducing elements extends as far as the head face.

7. A magnetic head as claimed in claim 1 characterized in that at least one of the transducing elements extends as far as the head face.

8. A multilayer thin-film magnetic head comprising:
   (a) a substrate,
   (b) a first transducing element and a second transducing element, which elements are located at different distances from the substrate,
   (c) three substantially parallel extending magnetically conducting flux guides for magnetic cooperation with said elements,
   (d) a non-magnetic read gap adjacent to a head face extending between the first flux guide and the second flux guide, and
   (e) a non-magnetic write gap adjacent to the head face extending between the second flux guide and the third flux guide, said gaps, viewed from the substrate, being situated one above the other, characterized in that the second flux guide extending between the first flux guide and the third flux guide comprises two soft-magnetic layers and an insulation layer of a non-magnetic material extending substantially parallel to the substrate and being situated between the soft-magnetic layers, the soft-magnetic layers being interconnected in a magnetically conducting manner proximate to the head face, the insulation layer between the soft-magnetic layers has a thickness which is at least equal to $3\ h^2/\mu_r t$, in which h is the length of the shortest soft-magnetic layer of the second flux guide, viewed from the head face, $\mu_r = \sqrt{\mu_{ra}\cdot\mu_{rb}}$, in which $\mu_{ra}$ and $\mu_{rb}$ are the relative permeabilities of the materials of the first and second soft-magnetic layers, respectively, and in which $t = \sqrt{t_a\cdot t_b}$ in which $t_a$ and $t_b$ are the thicknesses of the first and second soft-magnetic layers, respectively.

9. A magnetic head as claimed in claim 8, characterized in that the thickness of the insulation layer is at least 1 $\mu$m.

10. A magnetic head as claimed in claim 9, characterized in that the soft-magnetic layers have at least substantially the same thicknesses.

11. A magnetic head as claimed in claim 9, in which the first transducing element is a magnetoresistive element and the second transducing element is an inductive element and in which the first flux guide is an interrupted layer having two spatially separated flux guide parts bridged by the magnetoresistive element, and the magneto-resistive element is present at a side, remote from the inductive element, of the first flux guide.

12. A magnetic head as claimed in claim 9, characterized in that at least one of the transducing elements extends as far as the head face.

13. A magnetic head as claimed in claim 8, characterized in that the soft-magnetic layers have at least substantially the same thicknesses.

14. A magnetic head as claimed in claim 8, in which the first transducing element is a magnetoresistive element and the second transducing element is an inductive element and in which the first flux guide is an interrupted layer having two spatially separated flux guide parts bridged by the magnetoresistive element, and the magneto-resistive element is present at a side, remote from the inductive element, of the first flux guide.

15. A magnetic head as claimed in claim 8, characterized in that at least one of the transducing elements extends as far as the head face.

16. A multilayer thin-film magnetic head comprising:
(a) a substrate,
(b) a first transducing element and a second transducing element, which elements are located at different distances from the substrate,
(c) three substantially parallel extending magnetically conducting flux guides for magnetic cooperation with said elements,
(d) a non-magnetic read gap adjacent to a head face extending between the first flux guide and the second flux guide, and
(e) a non-magnetic write gap adjacent to the head face extending between the second flux guide and the third flux guide, said gaps, viewed from the substrate, being situated one above the other, characterized in that the second flux guide extending between the first flux guide and the third flux guide comprises two soft-magnetic layers and an insulation layer of a non-magnetic material extending substantially parallel to the substrate and being situated between the soft-magnetic layers, the soft-magnetic layers being interconnected in a magnetically conducting manner proximate to the head face, in which the first transducing element is a magneto-resistive element and the second transducing element is an inductive element and in which the first flux guide is an interrupted layer having two spatially separated flux guide parts bridged by the magneto-resistive element and the magneto-resistive element is present at a side, remote from the inductive element, of the first flux guide.

17. A magnetic head as claimed in claim 8, characterized in that the first flux guide is the flux guide situated most proximate to the substrate, the magnetoresistive element extending between said flux guide and the substrate.

18. A magnetic head as claimed in claim 17, characterized in that at least one of the transducing elements extends as far as the head face.

19. A magnetic head as claimed in claim 16, characterized in that at least one of the transducing elements extends as far as the head face.

20. A multilayer thin-film magnetic head comprising:
(a) a substrate,
(b) a first transducing element and a second transducing element, which elements are located at different distances from the substrate,
(c) three substantially parallel extending magnetically conducting flux guides for magnetic cooperation with said elements,
(d) a non-magnetic read gap adjacent to a head face extending between the first flux guide and the second flux guide, and
(e) a non-magnetic write gap adjacent to the head face extending between the second flux guide and the third flux guide, said gaps, viewed from the substrate, being situated one above the other, characterized in that the second flux guide extending between the first flux guide and the third flux guide comprises two soft-magnetic layers and an insulation layer of a non-magnetic extending substantially parallel to the substrate and being situated between the soft-magnetic layers, the soft-magnetic layers being interconnected in a magnetically conducting manner proximate to the head face, in that the insulation layer between the soft-magnetic layers is situated at a distance from the head face and has a thickness which is at least equal to $3\ h^2/\mu_r\cdot t$, in which h is the length of the shortest soft-magnetic layer of the second flux guide, viewed from the head face, $\mu_r = \sqrt{\mu_{ra}\cdot\mu_{rb}}$, in which $\mu_{ra}$ and $\mu_{rb}$ are the relative permeabilities of the materials of the first and second soft-magnetic layers, respectively, and in which $t = \sqrt{t_a\cdot t_b}$, in which $t_a$ and $t_b$ are the thickness of the first and the second soft magnetic layer, respectively, and the second flux guide has an end portion situated at the head face and formed exclusively from a soft-magnetic material, the insulation layer being adjacent to said end portion.

21. A multilayer thin-film magnetic head comprising:
(a) a substrate,
(b) a first transducing element and a second transducing element, which elements are located at different distances from the substrate,
(c) three substantially parallel extending magnetically conducting flux guides for magnetic cooperation with said elements,
(d) a non-magnetic read gap adjacent to a head face extending between the first flux guide and the second flux guide, and
(e) a non-magnetic write gap adjacent to the head face extending between the second flux guide and the third flux guide, said gaps, viewed from the substrate, being situated one above the other, characterized in that the second flux guide extending between the first flux guide and the third flux guide comprises two soft-magnetic layers and an insulation layer of a non-magnetic material extending substantially parallel to the substrate and being situated between the soft-magnetic layers, the soft-magnetic layers being interconnected in a magnetically conducting manner proximate to the head face, in that the insulation layer is situated at a distance from the head face, the second flux guide has an end portion situated at the head face and consists of a soft-magnetic material, the insulation layer is adjacent to said end portion, the first transducing element is a magnetoresistive element and the second transducing element is an inductive element and in which the first flux guide is an interrupted layer having two spatially separated flux guide parts bridged by the magnetoresistive element, and the magneto-resistive element is present at a side, remote from the inductive element, of the first flux guide.

22. A multilayer thin-film magnetic head comprising:
(a) a substrate,
(b) a first transducing element and a second transducing element, which elements are located at different distances from the substrate,
(c) three substantially parallel extending magnetically conducting flux guides for magnetic cooperation with said elements,
(d) a non-magnetic read gap adjacent to a head face extending between the first flux guide and the second flux guide, and
(e) a non-magnetic write gap adjacent to the head face extending between the second flux guide and the third flux guide, said gaps, viewed from the substrate, being situated one above the other, characterized in that the second flux guide extending between the first flux guide and the third flux guide comprises two soft-magnetic layers and an insulation layer of a non-magnetic material extending substantially parallel to the substrate and being situated between the soft-magnetic layers, the soft-magnetic layers being interconnected in a magnetically conducting manner proximate to the head face, the soft-magnetic layers have substantially the same thickness, the first transducing element is a magnetoresistive element and the second transducing element is an inductive element and in that the first flux guide is an interrupted layer having two spatially separated flux guide parts bridged by the magnetoresistive element, and the magnetoresistive element is present at a side, remote from the inductive element, of the first flux guide.

* * * * *